United States Patent [19]
Donoho et al.

[11] Patent Number: 5,877,678
[45] Date of Patent: Mar. 2, 1999

[54] ANNUNCIATOR CONTROL CIRCUIT

[75] Inventors: T. Keith Donoho, Frankfort; Scott A. Kloeblen, Lafayette, both of Ind.

[73] Assignee: Caterpillar Inc., Peoria, Ill.

[21] Appl. No.: 899,965

[22] Filed: Jul. 24, 1997

[51] Int. Cl.$^6$ .................................................... B60Q 1/00
[52] U.S. Cl. .................... 340/438; 340/506; 340/310.01; 307/10.1
[58] Field of Search ..................................... 340/438, 692, 340/326, 628, 500, 506, 310.01, 310.06; 307/10.1

[56] References Cited

U.S. PATENT DOCUMENTS 3,641,547  2/1972  Reiss et al. .............................. 340/512

*Primary Examiner*—Jeffery A. Hofsass
*Assistant Examiner*—Daryl C. Pope
*Attorney, Agent, or Firm*—Haverstock, Garrett & Roberts

[57] ABSTRACT

An annunciator control circuit adaptable for responding to a plurality of types of fault indicative inputs is provided. The control circuit includes a signal conditioning circuit portion having an input line and an output line. The signal conditioning circuit also includes switch means adjustable for selectively configuring the signal conditioning circuit portion to receive each of the plurality of types of fault indicative inputs at the input line thereof and to provide a conditioned fault indicative output signal in response thereto at the output line. The control circuit further includes a first latching circuit portion connected to the output line of the signal conditioning circuit portion and having a first output line. A first switching transistor of the control circuit includes a base, collector, and emitter, the base connected to the first output line of the first latching circuit portion. In response to receipt of the conditioned fault indicative output signal from the signal conditioning circuit portion, an output at the first output line of the first latching circuit portion latches the first switching transistor in an ON state. When the first switching transistor is connected to an operator output device such as a lamp or horn, the annunciator control circuit can be utilized to convey to an operator the occurrence of some type of fault in a system being monitored.

13 Claims, 2 Drawing Sheets

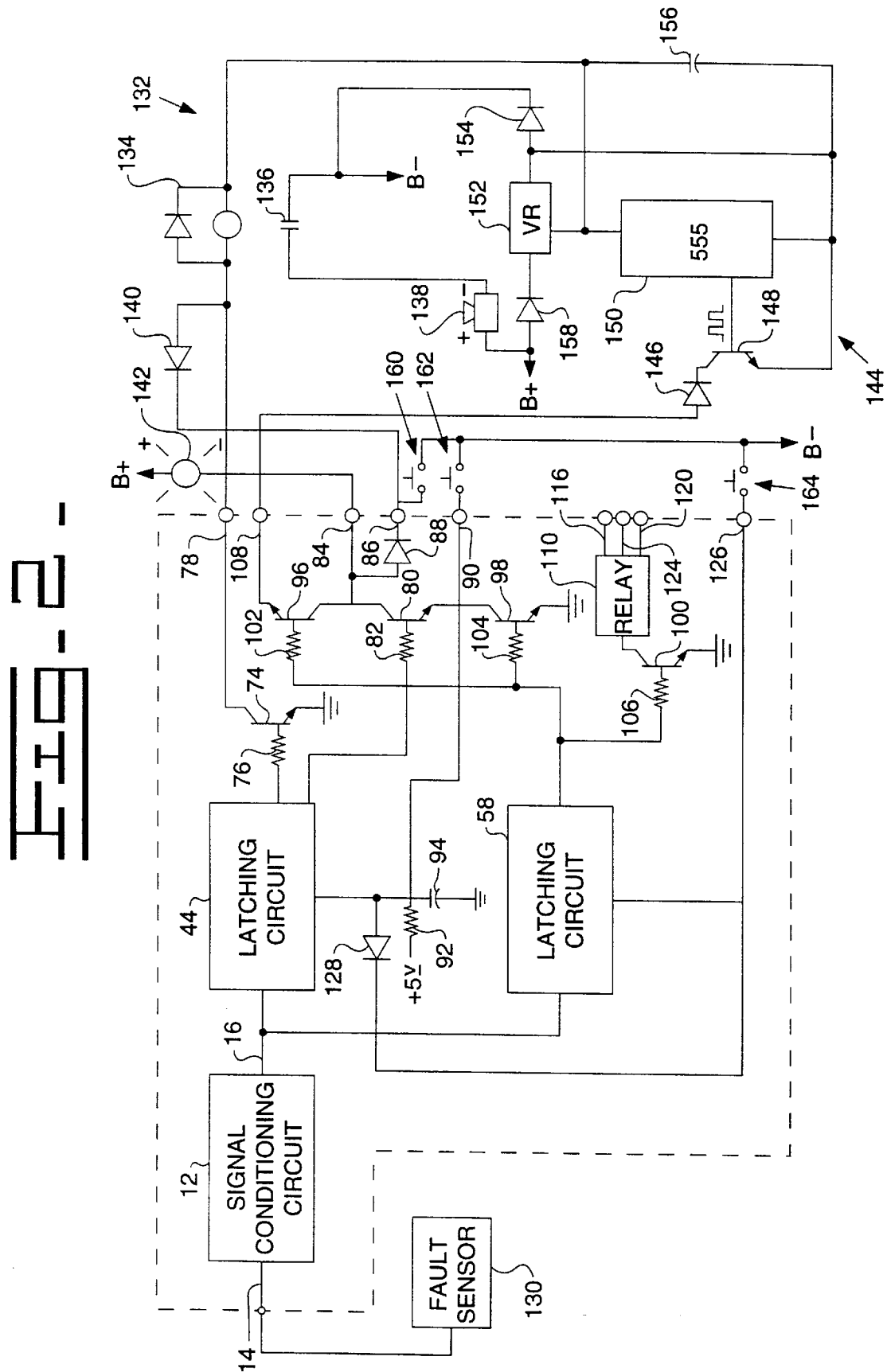

5,877,678

ANNUNCIATOR CONTROL CIRCUIT

DESCRIPTION

1. Technical Field

This invention relates generally to an annunciator control device and more particularly, to an annunciator control circuit adaptable for responding to a plurality of types of fault indicative input signals so as to effect operation of an operator output device.

2. Background Art

In engine management systems such as those used in heavy machinery, a variety of engine operating conditions or parameters are typically monitored to determine when a critical change in any of such parameters or conditions exists within the engine or the system. For example, such systems can monitor whether an excessive increase in oil temperature occurs, whether an over-speed condition exists, or whether a low fuel level exists. If such a critical condition or potential critical condition exists it is desirable to communicate such to an operator as a warning through use of an operator output device. Typically a visual output device such as a warning lamp, and/or an audible output device such as a warning horn, might be used to alert the operator to the condition When a critical change occurs in one of the monitored parameters, a fault indicative signal is typically produced. There are a variety of types of fault indicative signals that can be produced within various systems. In the past the sensors used to monitor the engine parameters have been hard wired with discrete logic relays and timers to the operator output devices, with the majority of the discrete logic components being located on an annunciator panel. Each annunciator panel was typically built from component parts and a given annunciator panel was only compatible with the engine size or model for which it was designed. This limited compatibility increased the cost associated with utilizing annunciator panels in various systems due to the additional cost for designing and manufacturing separate annunciator panels for different systems. The process of hard wiring the components to the sensors and output devices is labor intensive, which also increased manufacturing costs.

In the event that a component on an annunciator panel failed, such hard wired component needed to be removed from the panel and replaced. Similarly, in the event that a given sensor was changed out or updated, often times the discrete components on the annunciator panel associated with such sensor would also need to be changed out. Regardless of the reason, such replacement and changing out of the discrete components again proved costly due to the extensive labor involved, as well as the additional cost of different components.

Accordingly, the present invention is directed to overcoming one or more of the problems as set forth above.

DISCLOSURE OF THE INVENTION

In one embodiment of the present invention an annunciator control circuit adaptable for responding to a plurality of types of fault indicative inputs is provided. The control circuit includes a signal conditioning circuit portion having an input line and an output line. The signal conditioning circuit also includes switch means adjustable for selectively configuring the signal conditioning circuit portion to receive each of the plurality of types of fault indicative inputs at the input line thereof and to provide a conditioned fault indicative output signal in response thereto at the output line. The control circuit further includes a first latching circuit portion connected to the output line of the signal conditioning circuit portion and having a first output line. A first switching transistor of the control circuit includes a base, collector, and emitter, the base connected to the first output line of the first latching circuit portion. In response to receipt of the conditioned fault indicative output signal from the signal conditioning circuit portion, an output at the first output line of the first latching circuit portion latches the first switching transistor in an ON state. Therefore, when the first switching transistor is connected to an operator output device such as a lamp or horn, the annunciator control circuit can be utilized to convey to an operator the occurrence of some type of fault in a system being monitored.

The signal conditioning circuit portion enables the annunciator control circuit to be adapted to receive a plurality of types of fault indicative input signals by setting the switch means. For example, in one embodiment the signal conditioning circuit portion includes an input line, an output line, voltage regulator means, an inverter, and a plurality of position selectable switches. The input line is connected to an input of the voltage regulator means and an output of the voltage regulator means is connected to an input of the inverter. A first switch is connected between the input of the inverter and ground, a second switch is connected between the input of the voltage regulator and the input of the inverter, a third switch is connected between the input of the inverter and the output line, and a fourth switch is connected between the output of the inverter and the output line. By setting the switches in various open and closed combinations, different fault indicative input signals can be received by the signal conditioning circuit such that a conditioned output signal is provided at the output line of the signal conditioning circuit in response thereto. Accordingly, the present annunciator control circuit can be incorporated into various engine sizes or models, eliminating the high costs associated with heretofore utilized annunciator panels.

BRIEF DESCRIPTION OF THE DRAWINGS

For a better understanding of the present invention, reference may be made to the accompanying drawings in which:

FIG. 2 is a schematic illustration of the annunciator control circuit of FIG. 1 as installed within an exemplary system.

BEST MODE FOR CARRYING OUT THE INVENTION

Figure 1:
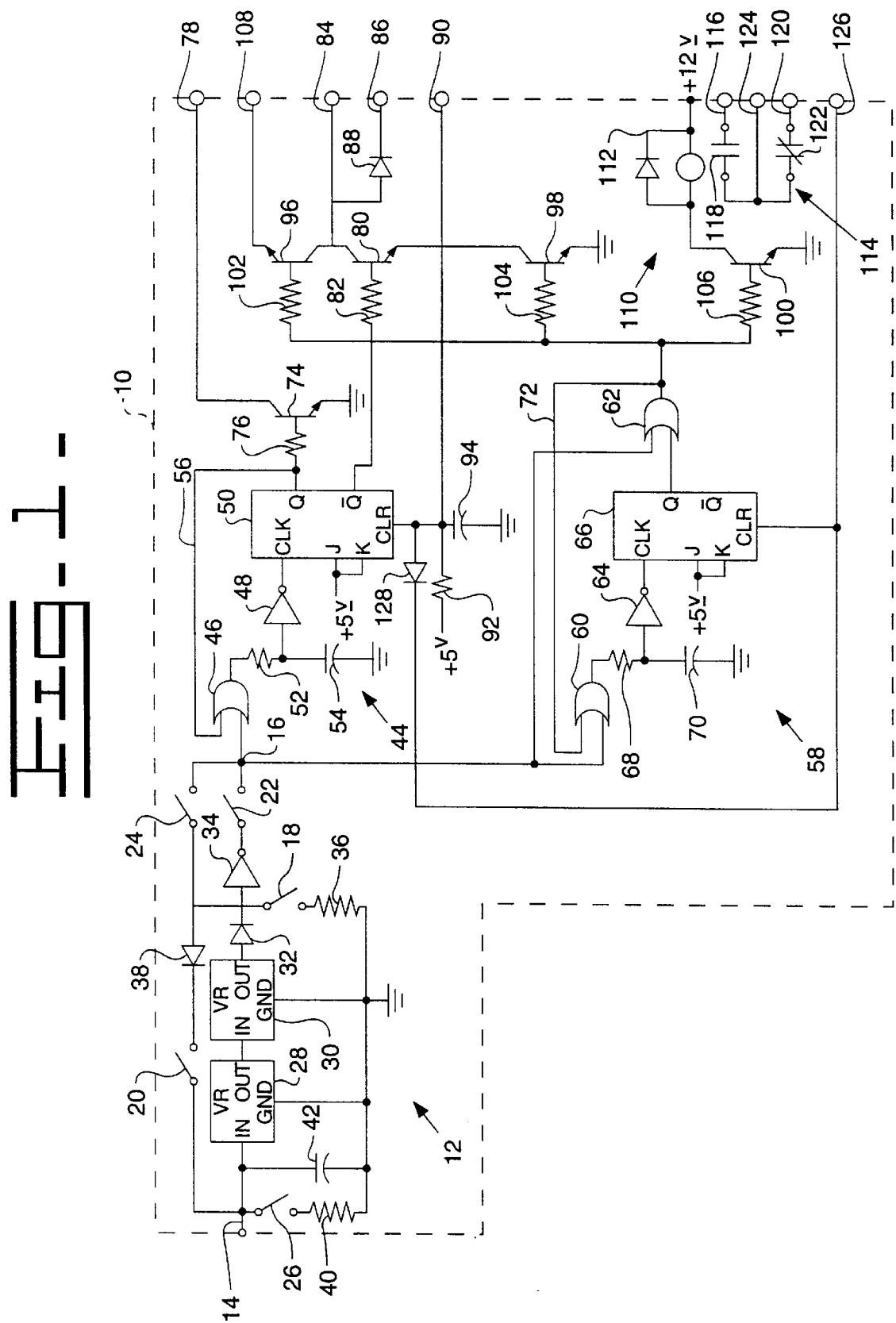
FIG. 1 is a schematic illustration of one embodiment of an annunciator control circuit.

Referring now to the drawings, FIG. 1 identifies an annunciator control circuit 10, including a signal conditioning circuit portion 12. The signal conditioning circuit portion 12 includes an input line 14, an output line 16, and a plurality of position selectable switches 18, 20, 22, 24, and 26, such as dip switches. Input line 14 is connected to an input of voltage regulator 28 which in turn has an output connected to an input of voltage regulator 30. An output of voltage regulator 30 is connected through a diode 32 to an input of an inverter 34, switch 22 being connected between an output of the inverter 34 and the output line 16. Switch 18 is connected between the input of inverter 34 and ground through a resistor 36. Switch 20 is connected between the input of inverter 34 and the input line 14 through a diode 38. Switch 24 is connected between the input of the inverter 34 and the output line 16. Switch 26 is connected between the input line 16 and ground through a resistor 40. A capacitor 42 is also connected between the input of voltage regulator 28 and ground.

A first latching circuit portion 44 is connected to the output line 16 of the signal conditioning circuit portion for receiving output signals therefrom and includes an OR gate 46, an inverter 48 and a J-K flip-flop 50. The output line 16 of the signal conditioning circuit portion 12 is connected to an input of the OR gate 46, and an output of the OR gate 46 is connected to an input of the inverter 48 through a resistor 52. A capacitor 54 is also connected between the input of the inverter and ground. An output of the inverter 48 is connected to a clock input of the flip-flop 50. The J and K inputs of the flip-flop are both connected to a positive reference voltage source, such as +5 volts, in order to place the flip-flop 50 in toggle mode. A Q output of the flip-flop is also connected in a feedback manner via line 56 to an input of the OR gate 46.

A second latching circuit portion 58 is connected to the output line 16 of the signal conditioning circuit portion for receiving output signals therefrom and includes a first OR gate 60, a second OR gate 62, an inverter 64 and a J-K flip-flop 66. The output line 16 of the signal conditioning circuit portion 12 is connected to both an input of the OR gate 60 and an input of the OR gate 62. An output of the OR gate 60 is connected to an input of the inverter 64 through a resistor 68. A capacitor 70 is also connected between the input of the inverter 64 and ground. An output of the inverter 64 is connected to a clock input of the flip-flop 66. The J and K inputs of the flip-flop 66 are both connected to a positive reference voltage source, such as +5 volts, in order to place the flip-flop in toggle mode. A Q output of the flip-flop 66 is connected to an input of the OR gate 62 and an output of the OR gate 62 is connected in a feedback manner via line 72 to an input of the OR gate 60.

The description provided herein with respect to the J-K flip-flops 50 and 66 pertains to the use of TTL device type SN7473, which is a dual J-K flip-flop with clear. Referring again to the first latching circuit portion 44, the Q output of flip-flop 50 is connected to a base of switching transistor 74 through a resistor 76 for controlling the ON/OFF switching thereof. A line 78 is connected to a collector of switching transistor 74, and an emitter thereof is connected to ground. The Q-not output of flip-flop 50 is connected to a base of a switching transistor 80 through a resistor 82, and a line 84 is connected to a collector of switching transistor 80. Line 84 is also connected to a line 86 through a diode 88. A clearing input of flip-flop 50 is connected to a line 90, as well as a positive reference voltage, such as +5 volts, through a resistor 92. A capacitor 94 has one side connected to ground and an opposite side connected between the positive reference voltage and the clearing input of the flip-flop 50.

Referring to the second latching circuit portion 58, an output of the OR gate 62 is connected to a respective base of each of transistors 96, 98, and 100, through respective resistors 102, 104 and 106. A collector of switching transistor 96 is connected to the collector of transistor 80 and an emitter of switching transistor 96 is connected to a line 108. An emitter of transistor 80 is connected to a collector of transistor 98, such that the two transistors are connected in a series arrangement, the emitter of transistor 98 being connected to ground. A collector of transistor 100 is connected to a relay 110, specifically to the control portion 112 thereof. The relay 110 includes a contact portion 114 having a line 116 connected to a normally open contact 118, a line 120 connected to a normally closed contact 122, and a common line 124. A clearing input of flip-flop 66 is connected to a line 126. The clearing input of flip-flop 50 is also connected to line 126 through a diode 128.

The annunciator control circuit 10 may be utilized to respond to a plurality of types of fault indicative inputs. In particular, signal conditioning circuit portion 12 is adaptable for responding to at least three different fault indicative input signal types at input line 14 so as to provide a conditioned fault indicative output at output line 16. Such adaptability is provided by selecting certain ON/OFF combinations of switches 18, 20, 22, 24 and 26. The three types of fault indicative inputs include a positive normally open type, a positive normally closed type, and a negative normally open type. The voltage regulator means 28 and 30 are connected in series to enable a high fault input voltage to be regulated down to about +5 volts. For example, regulator 28 may be a 12 volt voltage regulator and regulator 30 may be a 5 volt voltage regulator. It is contemplated that only one voltage regulator might be used in some cases.

In the case of a positive normally open type fault input, the input line 14 is normally open, meaning that no voltage is applied thereto, when there is no fault condition. When a fault condition occurs, a positive voltage, typically from an electrical energy source such as a battery is applied at input line 14. For this type of fault input switches 20 and 22 are placed in an open position and switches 18, 24, and 26 are placed in a closed position. In this configuration, when there is no fault input, the output line 16 is pulled low to ground through closed switches 24 and 18 and resistor 36. When a fault input is received at input line 14, a conditioned high level output, or logic one, is applied from voltage regulator 30 through the diode 32, and through closed switch 24 to the output line 16.

In the case of a positive normally closed type fault input, the input line 14 is normally connected to a positive voltage source, such as a battery, when there is no fault condition. When a fault condition occurs, the input line 14 is open circuited such that no voltage is applied thereto. For this type of fault input switches 20 and 24 are placed in an open position and switches 18 and 22 are placed in a closed position. In this configuration, when there is no fault condition, the positive voltage applied at input line 14 is regulated through voltage regulators 28 and 30 such that a high level, or logic one, is applied to the input of inverter 34, which provides a low level output through closed switch 22 to the output line 16. When a fault input is received, meaning line 14 is open circuited, the input to inverter 34 will be grounded through closed switch 18 and resistor 36, causing a change in state at the output of inverter 34 so that a conditioned high level output, or logic one, is applied through closed switch 22 to the output line 16.

In the case of a negative normally open type fault input, the input line 14 is normally open, meaning that there is no voltage applied thereto, when there is no fault condition. When a fault condition occurs, the input line 14 is grounded. For this type of fault input switches 18, 24, and 26 are placed in an open position and switches 20 and 22 are placed in a closed position. In this configuration, when there is no fault condition, the input to inverter 34 is a float so that the output from the inverter is a low level, or logic zero, which is applied to output line 16 through closed switch 22. When a fault condition occurs, the input of inverter 34 is pulled to ground through diode 38 and closed switch 20, such that the state of the inverter output changes to a high level, or logic one, which is applied through closed switch 22 to output line 16.

For all of the described configurations, the conditioning circuit 12 provides a low level output, or logic zero, at output line 16 when there is no fault condition indicated by the input at line 14. Conversely, when there is a fault condition indicated by the input at line 14, a high level output, or logic one, is provided to the output line 16.

During initial start-up of the annunciator control circuit 10, the clearing input of each flip-flop 50 and 66 is initially low such that the Q output of each flip-flop 50 and 66 is set to a low level and the Q-not output of each flip-flop is set to a high level. Therefore, transistors 74, 96, 98, and 100 are placed in OFF states while transistor 80 is placed in an ON state. As capacitor 94 charges, the clearing input of the flip-flops 50 and 66 goes high so that the clearing function is no longer activated.

With respect to latching circuit portion 44, during no fault situations, the two inputs to OR gate 46 are low such that the output therefrom is also low. The input to inverter 48 is therefore low, being grounded through capacitor 54, which is initially uncharged, and the output of inverter 48 is therefore high, which is applied to the clock input of flip-flop 50. While the clock input of flip-flop 50 is high, the J and K inputs are loaded, which inputs in this case are both high. The latching circuit 44 remains in this state until a high level fault indicative signal appears at line 16, which high level is applied to the input of OR gate 46 causing the output of OR gate 46 to go high The capacitor 54 charges, and at a predetermined level the output of inverter 48 changes to a low level. The high to low transition of the clock input causes the outputs Q and Q-not to toggle such that the Q output goes high and Q-not output goes low. When the Q output goes high the latching circuit is set because the high output is provided through line 56 to an input of the OR gate 46. The transistor 74 is also placed in an ON state by the high level Q output and the transistor 80 is placed in an OFF state low level Q-not output.

With respect to latching circuit portion 58, during no fault situations, the two inputs to the OR gate 60 are low such that the output therefrom is also low. The input to inverter 64 is therefore low, being grounded through capacitor 70, which is initially uncharged, and the output of inverter 64 is therefore high, which is applied to the clock input of flip-flop 66. While the clock input of flip-flop 66 is high, the J and K inputs are loaded, which inputs in this case are both high. The latching circuit 58 remains in this state until a high level fault indicative signal appears at line 16, which high level is applied to the input of OR gate 60, causing the output of OR gate 60 to go high. The capacitor 70 charges, and at a predetermined level the output of inverter 64 changes to a low level. The high to low transition of the clock input causes the outputs Q and Q-not to toggle such that the Q output goes high and Q-not output goes low. The output of OR gate 62 goes high because at least the Q output is high, and the latching circuit is set because the high output of OR gate 62 is provided through line 72 to an input of the OR gate 60. Transistors 96, 98, and 100 are also placed in an ON state by the high level output of OR gate 62.

INDUSTRIAL APPLICABILITY

The industrial applicability of the annunciator control circuit 10 includes the ability of the circuit 10 to be adapted to receive a plurality of types of fault indicative inputs by setting the switches 18, 20, 22, 24, and 26 as previously described. Further, the circuit 10 can be constructed and packaged in module form, within a plastic encasement for example, the encasement being adapted for making connections to each of lines 14, 78, 84, 86, 90, 108, 116, 120, 124, and 126. A number of the modules can be utilized in a given application depending on the number of operating conditions or parameters which are to be monitored In the event of some change in a system, the modules are easily adaptable by changing the switch positions if necessary.

Other advantages of the annunciator control circuit 10 are particularly demonstrated with reference to FIG. 2 which illustrates the circuit 10 as installed in an exemplary application. In particular, the input line 14 of signal conditioning circuit 12 is connected to a fault sensor 130. Line 78 is connected to a relay 132 control portion 134, and the contact portion 136 of relay 132 is connected to an electrical energy source, such as battery B+, through an operator output device such as horn 138. The control portion 134 of relay 132 is also connected through a diode 140 to line 86.

Line 84 is connected to an electrical energy source, such as battery B+, through an operator output device such as lamp 142. Line 108 is connected to a flashing circuit 144, such connection being through a diode 146 to a collector of a switching transistor 148. The ON/OFF switching of transistor 148 is controlled by the output of a 555 timer 150 which may include associated circuit components necessary to configure the timer to provide a desired duty cycle. Voltage regulator 152 provides power for the 555 timer 150. Diode 154 is connected between the ground terminal of voltage regulator 152 and the negative side B− of the battery, and capacitor 156 is connected between the output of the voltage regulator 152 and the ground. A diode 158 is connected between the battery B+ and the voltage regulator input. Lines 86, 90, and 126 are also connected to the negative side of the battery B− through respective normally open switches 160, 162 and 164.

The operation of the annunciator control circuit 10 in this illustrated application is as follows. As described above, during initial power up of the system, with no fault condition, transistors 74, 96, 98, and 100 are placed in OFF states by the outputs of latching circuits 44 and 58, while transistor 80 is in an ON state. With these initial transistor states, neither the horn 138 nor the lamp 142 will be activated.

Upon occurrence of a fault condition, transistors 74, 96, 98 and 100 are all placed in an ON state, and transistor 80 is placed in an OFF state, due to the previously described toggling of the outputs of the latching circuits 44 and 58. These transistor states are temporarily fixed due to the latching nature of the circuits 44 and 58. Thus, the control portion 134 of relay 132 is connected to ground through transistor 74, which activates the relay 132, closing contact portion 136, and causing the horn 138 produce an audible signal which may be heard by a system operator. The lamp 142 is grounded through transistor 96, diode 146, and transistor 148 which varies between ON and OFF states. Thus, an intermittent path from the electrical energy source, through the lamp 142 to ground is created, causing the lamp 142 to begin flashing.

The audible and visible signals provided by the horn 138 and lamp 142 alert the system operator to the fault condition. The system operator may acknowledge the alert by temporarily closing the switch 162, causing the clearing input of the latching circuit 44 to go low, which effectively resets the outputs of latching circuit 44 to their original states so that transistor 74 is again placed in an OFF state and transistor 80 is placed in an ON state. This causes the relay 132 to deactivate and the horn 138 ceases production of the audible signal. Further, a permanent path to ground is provided from the lamp 142 through transistors 80 and 98 so that the lamp 142 remains on constantly rather than flashing.

The system operator may also attempt to reset the entire circuit by temporarily closing the switch 164 SO that the respective clearing input of each of the latching circuits 44 and 58 goes low. Similar to the case of operator acknowledgment, this causes the transistor 74 to be placed in an OFF state and the transistor 80 to be placed in an ON state. Further, if the fault signal is not still present at line 16, the latching circuit 58 will also be reset such that transistors 96, 98 and 100 are all again placed in an OFF state. At such point, neither the horn 138 nor the lamp 142 produces any operator detectable output until another fault condition occurs. If a fault signal is present at line 16, closing switch 164 will not reset the latching circuit 58. In particular, with reference to FIG. 1, because the signal at line 16 is provided as input to OR gate 62, the output of the OR gate 62 will always remain high as long as a high level fault signal is present at line 16. Thus, the operator cannot turn off the lamp 142 unless the fault condition is no longer present. This prevents an operator from attempting to ignore a continuing fault condition.

The illustrated system also includes connections for checking the operator output devices. In particular, if switch 160 is temporarily closed, both the lamp 142 and the horn 138 will be activated if they are working properly. The connections of relay 110 can be used, for example, to control the signaling of other operator output devices which might be connected thereto.

Other aspects, objects and advantages of the present invention can be obtained from a study of the drawings, the disclosure and the appended claims.

We claim:

1. An annunciator control circuit adaptable for responding to a plurality of types of fault indicative inputs, comprising:
    a signal conditioning circuit portion including an input line and an output line, the signal conditioning circuit portion including switch means adjustable for selectively configuring the signal conditioning circuit portion to receive each of the plurality of types of fault indicative inputs at the input line thereof and to provide a conditioned fault indicative output signal in response thereto at the output line thereof;
    a first latching circuit portion connected to the output line of the signal conditioning circuit portion and having a first output line;
    a first switching transistor including a base, collector, and emitter, the base connected to the first output line of the first latching circuit portion;
    wherein, in response to receipt of the conditioned fault indicative output signal from the signal conditioning circuit portion, an output at the first output line of the first latching circuit portion latches the first switching transistor in an ON state;
    a second latching circuit portion connected to the output line of the signal conditioning circuit portion and having an output line;
    a second switching transistor including a base, collector and emitter, the base connected to the output line of the second latching circuit portion;
    wherein, in response to receipt of the conditioned fault indicative input signal from the signal conditioning circuit portion, an output at the output line of the second latching circuit portion latches the second transistor in an ON state;
    wherein the first latching circuit portion includes a second output line, the annunciator control circuit further comprising:
    a third switching transistor including a base, collector and emitter, the base connected to the second output line of the first latching circuit portion, wherein, in response to receipt of the conditioned fault indicative output signal from the signal conditioning circuit portion, an output at the second output line of the first latching circuit portion latches the third transistor in an OFF state; and
    a fourth switching transistor including a base, collector and emitter, the base connected to the output line of the second latching circuit portion, the third and fourth transistors connected in series, wherein, in response to receipt of the conditioned fault indicative output signal from the signal conditioning circuit portion, the output at the output line of the second latching circuit portion latches the fourth transistor in an ON state.

2. The annunciator control circuit, as set forth in claim 1, further comprising:
    means for selectively resetting the first latching circuit portion, wherein, after the first latching circuit portion is reset, an output at the first output line places the first transistor in an OFF state and an output at the second output line places the third transistor in an ON state.

3. The annunciator control circuit, as set forth in claim 2, further comprising:
    means for selectively resetting the second latching circuit portion, wherein, after the second latching circuit portion is reset, an output at the output line thereof places the first and third transistors in an OFF state; and
    means for preventing reset of the second latching circuit portion while the conditioned fault indicative output signal is provided at the output line of the signal conditioning circuit portion.

4. An annunciator control circuit adaptable for responding to a plurality of types of fault indicative inputs, comprising:
    signal conditioning circuit portion including an input line and an output line, the signal conditioning circuit portion including switch means adjustable for selectively configuring the signal conditioning circuit portion to receive each of the plurality of types of fault indicative inputs at the input line thereof and to provide a conditioned fault indicative output signal in response thereto at the output line thereof;
    a first latching circuit portion connected to the output line of the signal conditioning circuit portion and having a first output line;
    a first switching transistor including a base, collector, and emitter, the base connected to the first output line of the first latching circuit portion;
    wherein, in response to receipt of the conditioned fault indicative output signal from the signal conditioning circuit portion, an output at the first output line of the first latching circuit portion latches the first switching transistor in an ON state;
    an electrical energy source;
    a relay including a control portion and a normally open contact portion, the control portion connected to the collector of the first switching transistor; and
    an operator output device connected in series with the relay contact portion to the electrical energy source.

5. An annunciator control circuit adaptable for responding to a plurality of types of fault indicative inputs, comprising:
    signal conditioning circuit portion including an input line and an output line, the signal conditioning circuit portion including switch means adjustable for selectively configuring the signal conditioning circuit portion to receive each of the plurality of types of fault indicative inputs at the input line thereof and to provide a conditioned fault indicative output signal in response thereto at the output line thereof;

a first latching circuit portion connected to the output line of the signal conditioning circuit portion and having a first output line;

a first switching transistor including a base, collector, and emitter, the base connected to the first output line of the first latching circuit portion;

wherein, in response to receipt of the conditioned fault indicative output signal from the signal conditioning circuit portion, an output at the first output line of the first latching circuit portion latches the first switching transistor in an ON state;

an electrical energy source; and an operator output device connected between the electrical energy source and the collector of the first switching transistor.

6. An annunciator control circuit, comprising:

a signal conditioning circuit adaptable for receiving a plurality of types of fault indicative signals, the circuit including an input line, an output line, voltage regulator means, an inverter, and a plurality of position selectable switches, the input line connected to an input of the voltage regulator means, an output of the voltage regulator means connected to an input of the inverter, a first switch connected between the input of the inverter and ground, a second switch connected between the input of the voltage regulator and the input of the inverter, a third switch connected between the input of the inverter and the output line, and a fourth switch connected between the output of the inverter and the output line.

7. The annunciator control circuit, as set forth in claim 6, wherein the signal conditioning circuit includes a fifth switch connected between the input of the voltage regulator means and ground.

8. The annunciator control circuit, as set forth in claim 6, wherein the voltage regulator means includes a first voltage regulator and a second voltage regulator connected in series.

9. The annunciator control circuit, as set forth in claim 6, further comprising:

a first latching circuit including an OR gate, an inverter, and a flip-flop, the output line of the signal conditioning circuit connected to a first input of the OR gate, an output of the OR gate connected to an input of the inverter, an output of the inverter connected to a clock input of the flip-flop, first and second inputs of the flip-flop connected to a positive reference voltage source, and a first output of the flip-flop connected to a second input of the OR gate.

10. The annunciator control circuit, as set forth in claim 9, further comprising:

a switching transistor having a base connected to the first output of the flip-flop of the first latching circuit.

11. The annunciator control circuit, as set forth in claim 9, further comprising:

a second latching circuit including a first OR gate, a second OR gate, an inverter, and a flip-flop, the output line of the signal conditioning circuit connected to a first input of the first OR gate and to a first input of the second OR gate, an output of the first OR gate connected to an input of the inverter, an output of the inverter connected to a clock input of the flip-flop, first and second inputs of the flip-flop connected to a positive reference voltage source, an output of the flip-flop connected to a second input of the second OR gate, and an output of the second OR gate connected to a second input of the first OR gate.

12. The annunciator control circuit, as set forth in claim 11, further comprising:

a first switching transistor having a base connected to the first output of the flip-flop of the first latching circuit;

a second switching transistor having a base connected to a second output of the flip-flop of the first latching circuit;

a third switching transistor having a base connected to the output of the second OR gate of the second latching circuit;

a fourth switching transistor having a base connected to the output of the second OR gate of the second latching circuit; and wherein a collector of the third switching transistor is connected to a collector of the second switching transistor and an emitter of the second switching transistor is connected to a collector of the fourth switching transistor.

13. An annunciator control module, as set forth in claim 12, further comprising:

a line connected to a clearing input of the flip-flop of the first latching circuit; and a line connected to a clearing input of the flip-flop of the second latching circuit and to the clearing input of the flip-flop of the first latching circuit.

* * * * *